United States Patent [19]

Han

[11] Patent Number: 5,605,505
[45] Date of Patent: Feb. 25, 1997

[54] TWO-PLAYER GAME PLAYING APPARATUS USING WIRELESS REMOTE CONTROLLERS

[75] Inventor: Jang W. Han, Kyungki-do, Rep. of Korea

[73] Assignee: LG Electronics Co., Ltd., Seoul, Rep. of Korea

[21] Appl. No.: 393,771

[22] Filed: Feb. 24, 1995

[30] Foreign Application Priority Data

Feb. 25, 1994 [KR] Rep. of Korea ............... 1994-3478

[51] Int. Cl.$^6$ ........................................... A63F 9/22
[52] U.S. Cl. ........................................... 463/39
[58] Field of Search ........................................... 463/39

[56] References Cited

U.S. PATENT DOCUMENTS

| | | | |
|---|---|---|---|
| 4,111,421 | 9/1978 | Mierzwinski | 463/39 |
| 4,531,740 | 7/1985 | Green et al. | 463/39 X |
| 4,924,216 | 5/1990 | Leung | 463/39 X |
| 5,364,108 | 11/1994 | Esnouf | 463/39 X |

Primary Examiner—William H. Grieb
Attorney, Agent, or Firm—Finnegan, Henderson, Farabow, Garrett & Dunner, L.L.P.

[57] ABSTRACT

A two-player game playing apparatus using wireless remote controllers includes a first remote controller, a second remote controller, a first remote control signal receiver for receiving a game key signal transmitted from the first remote controller, a second remote control signal receiver for receiving the game key signal transmitted from the second remote controller, a decoder, a game pack, a game processor, and a video outputting apparatus, thereby allowing two players to enjoy a game with wireless remote controllers. Further, a microcomputer is employed only in one of the two remote controllers, thereby reducing the production cost and simplifying the configuration.

13 Claims, 8 Drawing Sheets

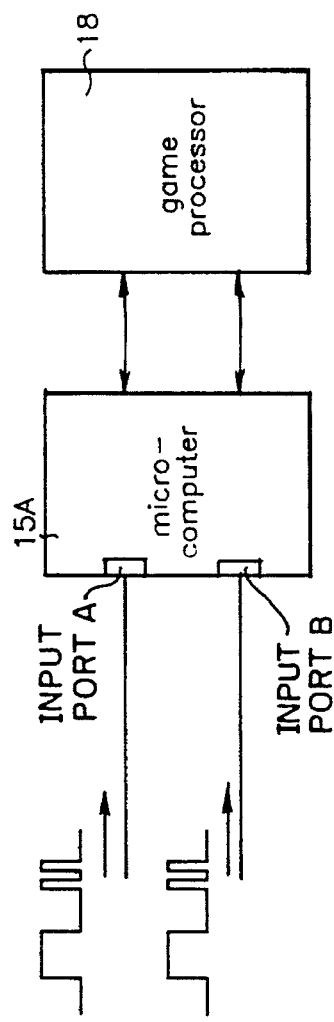
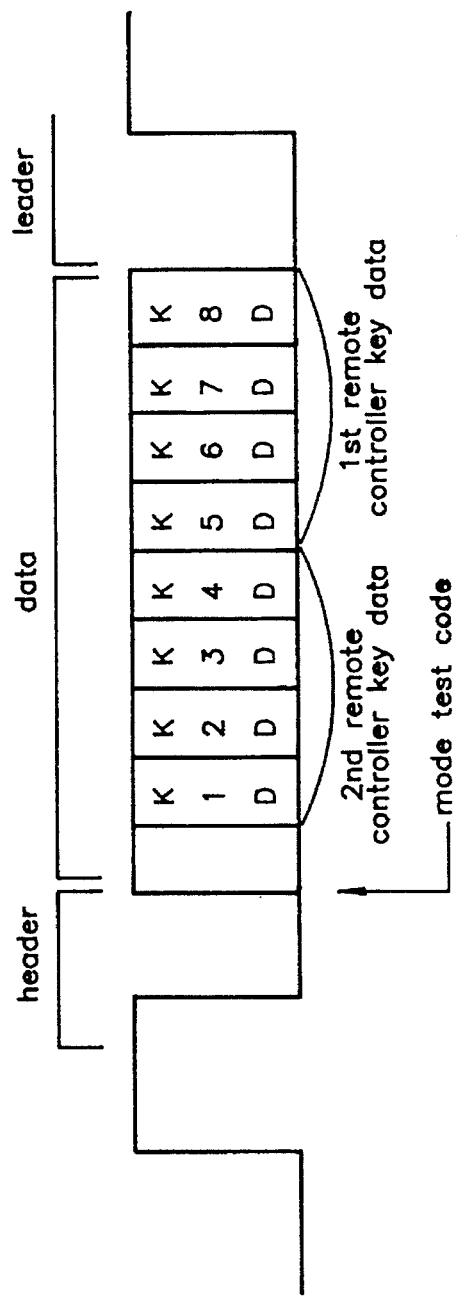

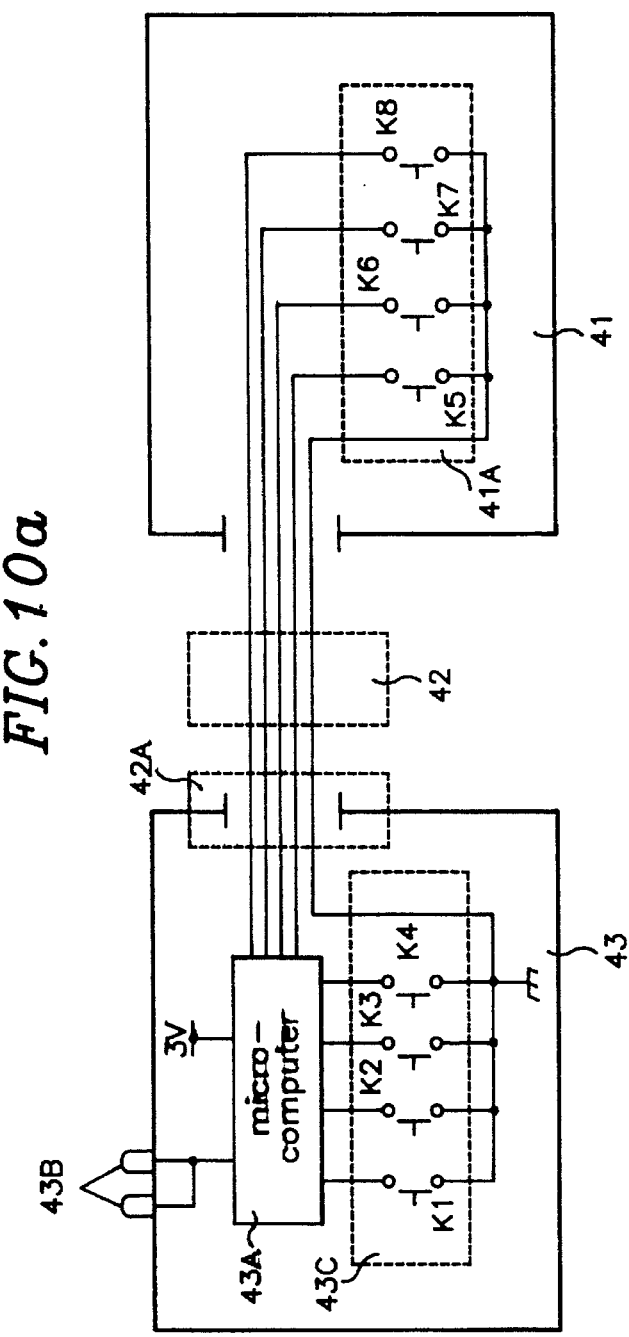
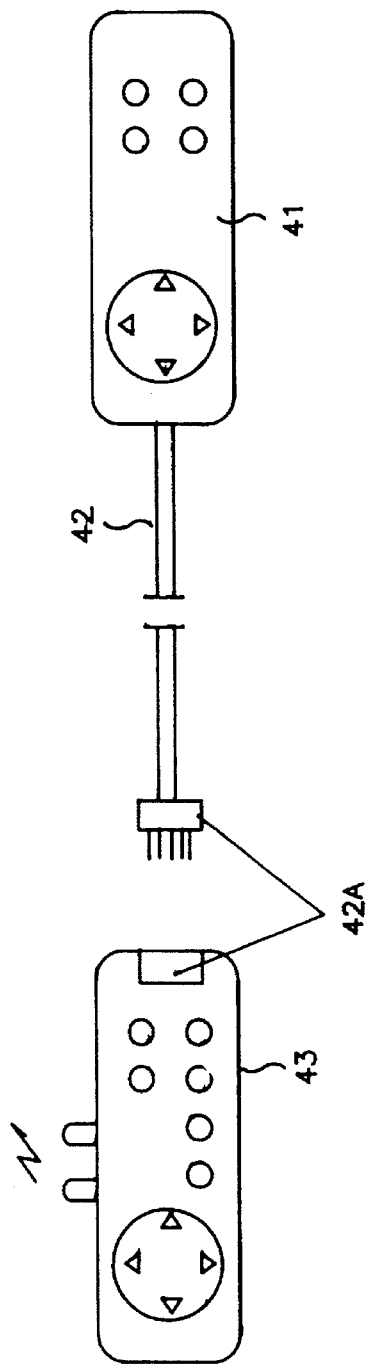
FIG.10a
FIG.10b

TWO-PLAYER GAME PLAYING APPARATUS USING WIRELESS REMOTE CONTROLLERS

FIELD OF INVENTION

The present invention relates to a two-player game playing apparatus using wireless remote controllers in which a video outputting apparatus is used so that two players play games with the wireless remote controllers.

BACKGROUND OF THE INVENTION

A conventional two-player game playing apparatus using remote controllers comprises, as shown in FIG. 1, a game playing apparatus body 1, a game pack 2 coupled to game playing apparatus body 1 for providing a game program, a wire remote controller 3 coupled to game playing apparatus body 1 with a wire cable and used by a first player, a wireless remote controller 4 coupled to game playing apparatus body 1 without a wire and used by a second player, and a video outputting apparatus 5 connected to game playing apparatus body 1 for outputting an image and sound. With this game playing apparatus, the first and second players are able to play games with wire remote controller 3 and wireless remote controller 4.

Here, game playing apparatus body 1 comprises a remote control signal receiver 6 for receiving a signal output from wireless remote controller 4, a decoder 7 for decoding the signal output from remote control signal receiver 6, and a game IC 8 for reading and performing the program of game pack 2 according to the signal output from decoder 7 and the signal output from wire remote controller 3.

The operation of the conventional two-player game playing apparatus using remote controllers will be described below.

First, in a case in which a game is performed with wire remote controller 3, a game key signal input by a player through the key of wire remote controller 3 is read as game key information in wire remote controller 3, and input to game IC 8 through a wire cable. Game IC 8 reads out and performs the game program of game pack 2 according to the game key information input through the wire cable. The video and audio signals output as the result of game IC (8)'s performance are processed in video outputting apparatus 5, and output as an image and sound.

In a case in which a game is carried out with wireless remote controller 4, the game key signal input by a player through wireless remote controller 4 is read out as game key information in wireless remote controller 4. The signal is converted into an infrared signal and then transmitted. The transmitted infrared game key information is received in remote control signal receiver 6 and converted into an electrical signal. The converted electrical signal is decoded in decoder 7 and output to game IC 8. Game IC 8 reads out and performs the game program of game pack 2 according to the signal output from decoder 7. The video and audio signals output as the result of game performance from game IC 8 are processed in video outputting apparatus 5 and output as an image and sound.

In a case in which two players perform a game with both wire remote controller 3 and wireless remote controller 4, the game key signal input through wire remote controller 3 and wireless remote controller 4 by the first and second players is read out as game key information in wire remote controller 3 and wireless remote controller 4, and then input to game IC 8 through a wire cable, remote control signal receiver 6 and decoder 7. The input signal is processed and performed therein.

In performing such a game function, wire remote controller 3 and wireless remote controller 4 each consist of a microcomputer which reads out and encodes the game key signal, that is, input key information, to thereby control the wire or wireless transmission of the information.

However, since the conventional two-player game playing apparatus has only one wireless remote controller 4 and provides only a game function in which one wireless remote controller 4 is used, in a case in which two players perform a game, there involves a limit and inconvenience so that one player must use wireless remote controller 4 while the other player uses wire remote controller 3.

SUMMARY OF INVENTION

It is therefore an object of the present invention to provide a two-player game playing apparatus using wireless remote controllers in which two players transmit a game key signal with two wireless remote controllers and perform a game so that two players can play games without a wire.

To accomplish the object of the present invention, one embodiment of the two-player game playing apparatus using wireless remote controllers comprises two remote controllers, two remote control signal receivers, a decoder, a game pack, a game processor, and a video outputting apparatus. A first remote controller transmits a game key signal input by a first player in a specific frequency band without a wire, and a second remote controller transmits a game key signal input by a second player, without a wire in a frequency band which is different from the frequency band of the game key signal transmitted from the first remote controller. A first remote control signal receiver receives the game key signal transmitted from the first remote controller without a wire and a second remote control signal receiver receives the game key signal transmitted from the second remote controller without a wire. The decoder reads out the respective players' game key signals output from the first and second remote control signal receivers. The game pack provides a game program. The game processor reads out and performs the game program from the game pack according to the respective players' game key signals output from the decoder, and the video outputting apparatus processes game video and audio signals output from said game processor and outputs the signals as an image and sound.

In another embodiment of the present invention, a two-player game playing apparatus using wireless remote controllers comprises a first remote controller for outputting a game key signal input by a first player through a wire cable and a second remote controller connected to the first remote controller with the wire cable so that the game key signal input through the wire cable from the first remote controller and the game key signal input by a second player are transmitted without a wire. A remote control signal receiver receives the game key signal transmitted from the second remote controller without a wire, a decoder reads out the respective players' game key signals output from the remote control signal receiver. A game pack provides a game program, a game processor reads out and performs a program from the game pack according to the respective players' game key signals output from the decoder, and a video outputting apparatus processes game video and audio signals output from the game processor and outputs the signals in an image and sound.

BRIEF DESCRIPTION OF THE DRAWINGS

FIG. 6 is a detailed block diagram of the decoder of FIG. 2;

FIG. 10A is a detailed diagram of the remote controller of FIG. 9;

FIG. 10B is a diagram of connection between the remote controllers of FIG. 9; and FIG. 11 is a format diagram of the transmission signal of the remote controllers of FIG. 9.

DETAILED DESCRIPTION OF THE PREFERRED EMBODIMENTS

Figure 1:
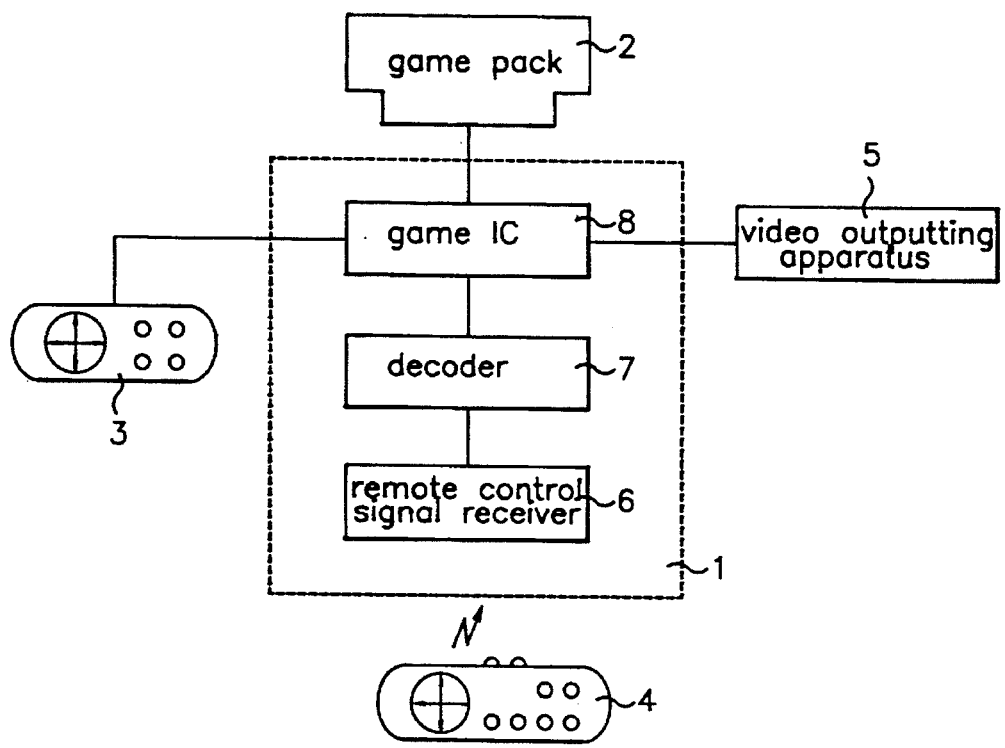
FIG. 1 is a block diagram of a conventional two-player game playing apparatus using remote controllers.
Figure 2:
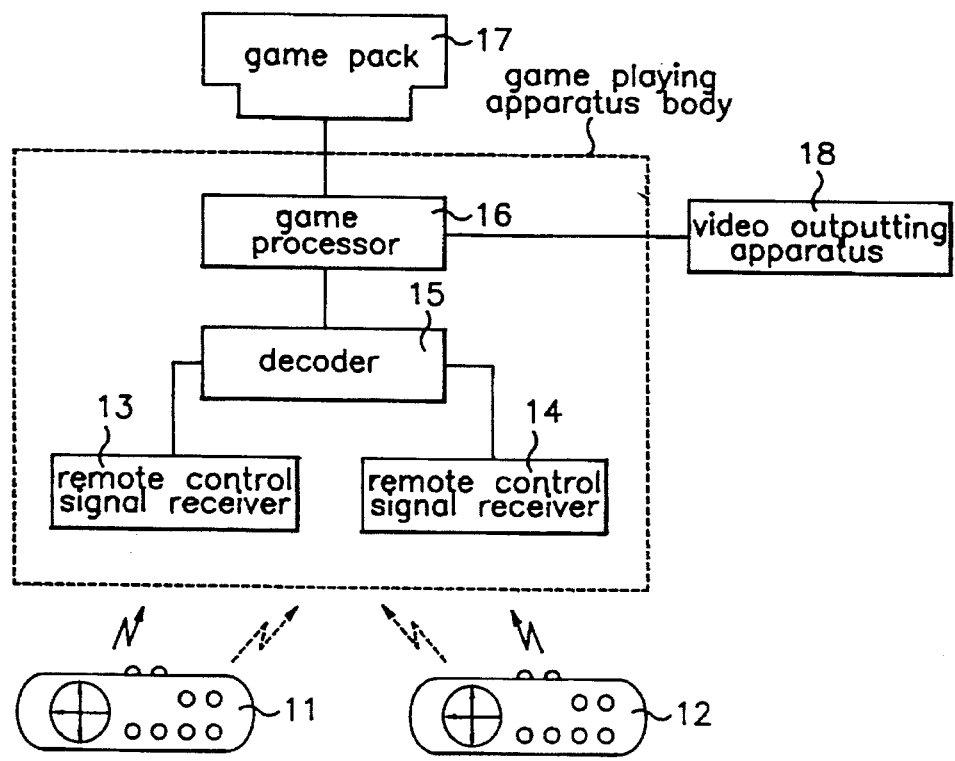
FIG. 2 is a block diagram of one embodiment of a two-player game playing apparatus using wireless remote controllers of the present invention.

Referring to FIG. 2, one embodiment of the two-player game playing apparatus using wireless remote controllers comprises first and second remote controllers 11 and 12, first and second remote control signal receivers 13 and 14, a decoder 15, a game processor 16, a game pack 17, and a video outputting apparatus 18.

First remote controller 11 transmits a game key signal input by a first player in a specific frequency band, that is, 38 KHz, without a wire. Second remote controller 12 transmits a game key signal input by a second player, without a wire, in a frequency band, that is, 100 KHZ, which is different from the frequency band of the game key signal transmitted from first remote controller 11.

First remote control signal receiver 13 receives the game key signal transmitted from first remote controller 11 without a wire, with second remote control signal receiver 14 receiving the game key signal transmitted from second remote controller 12 without a wire. The receivers 13 and 14 filter the received signals at corresponding frequencies. Specifically, first remote control signal receiver 13 receives the game key signal transmitted from first remote controller 11 without a wire, and filters the signal at 38 KHz. Second remote control signal receiver 14 receives the game key signal transmitted from second remote controller 12 without a wire, and filters the signal at 100 KHz.

Decoder 15 reads out the players' game key signals output from first and second remote control signal receivers 13 and 14. Game pack 17 provides a game program.

Game processor 16 reads out and performs the program from game pack 17 according to the players' game key signals output from decoder 15. This game processor is constructed in the same manner as the game IC.

Video outputting apparatus 18 processes the game video and audio signals output from game processor 16, outputting them as an image and sound.

The operation of the two-player game playing apparatus using wireless remote controllers of the present invention will be described below.

When the first and second players receive the game key signals with keys of first and second remote controllers 11 and 12, respectively, first and second remote controllers 11 and 12 generate and transmit game key signals of different frequency bands, that is, 38 KHz and 100 KHz, without a wire.

The game key signals transmitted from first and second remote controllers 11 and 12 are received by first and second remote control signal receivers 13 and 14, and filtered at corresponding frequency bands, that is, 38 KHz and 100 KHz. The filtered signals are output to decoder 15. With respect to the game key signals output from first and second remote control signal receivers 13 and 14, decoder 15 reads out which player presses the key signal, and outputs the read result to game processor 16.

Game processor 16 reads out and performs the program from game pack 17 according to the signal output from decoder 15, and outputs video and audio signals to video outputting apparatus 18 as the performance result. Video outputting apparatus 18 displays the signals on a monitor (not shown).

Figure 3:
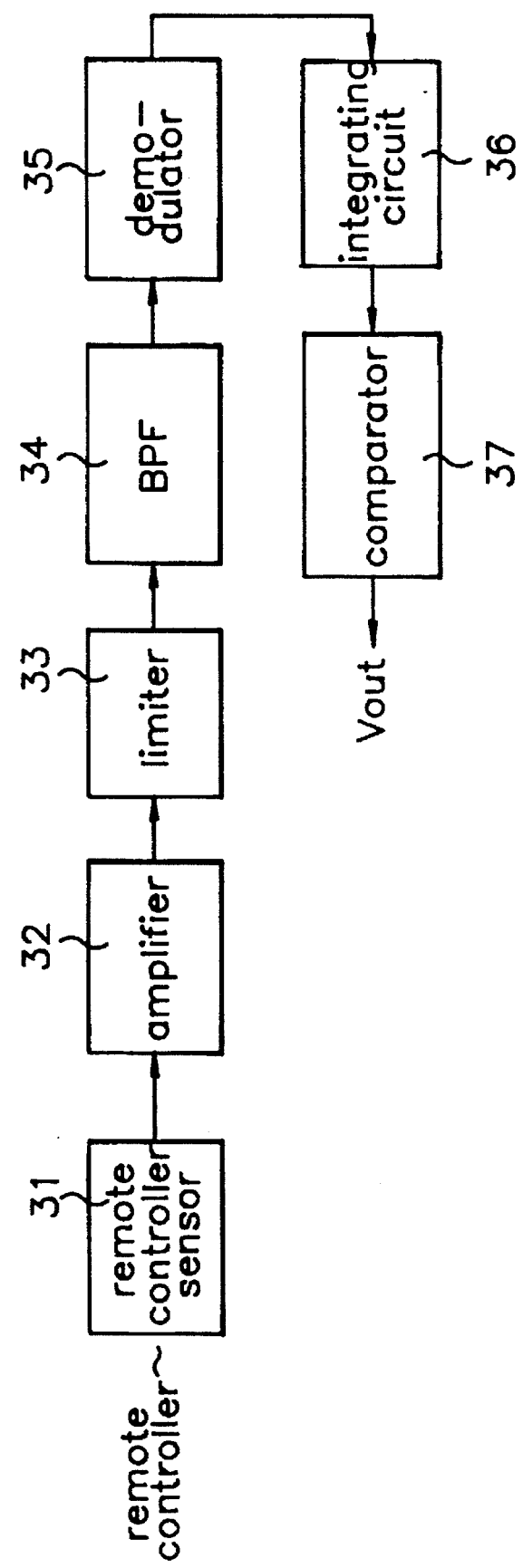
FIG. 3 is a detailed block diagram of the remote control signal receiver of FIG. 2.

As shown in FIG. 3, first and second remote control signal receivers 13 and 14 each comprise a remote controller sensor 31 for receiving the game key signal transmitted from corresponding remote controller 11 or 12 without a wire and converting the signal into an electrical signal, an amplifier 32 for amplifying the signal output from remote controller sensor 31, a limiter 33 for limiting the level of the signal output from amplifier 32, a band-pass filter 34 for filtering the signal output from limiter 33 at a frequency band, that is, 38 KHz or 100 KHz, corresponding to the transmission frequency band of remote controller 11, a demodulator 35 for demodulating the signal output from band-pass filter 34, an integrating circuit 36 for integrating the signal output from demodulator 35, and a comparator 37 for waveform-shaping the signal output from integrating circuit 36.

Figure 4:
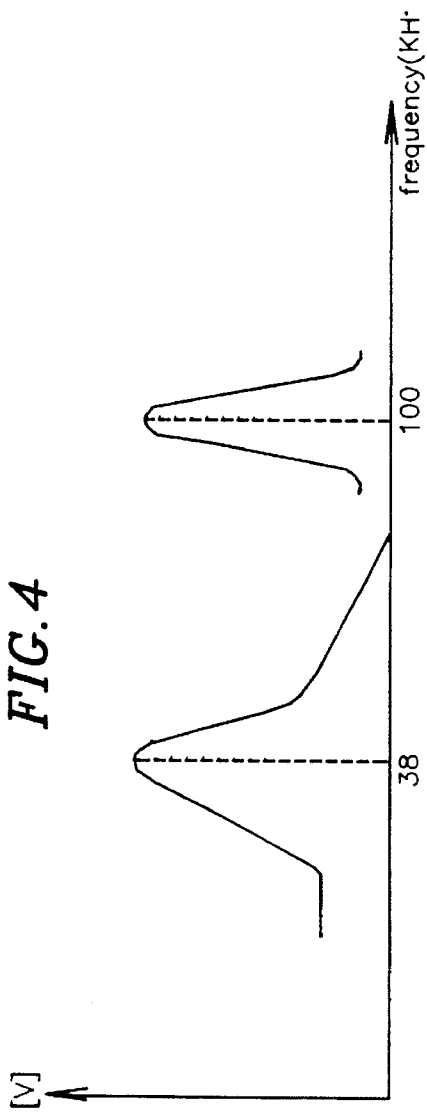
FIG. 4 is a spectral diagram of the frequency band of the band-pass filter of FIG. 3.

The operation of the first and second remote control signal receivers 13 and 14 will be explained with reference to FIG. 4.

The game key signals output from first and second remote controllers 11 and 12 without a wire are received by remote controller sensor 31, converted into an electrical signal, amplified in amplifier 32, and limited in limiter 33.

The level-limited signals output from limiter 33 are filtered at frequency bands corresponding to the transmission frequency bands of first and second remote controllers 11 and 12. Specifically, as shown in FIG. 4, band-pass filter 34 of first remote control signal receiver 13 filters the signal output from limiter 33 at 38 KHz. Band-pass filter 34 of second remote control signal receiver 14 filters the signal at 100 KHz.

The filtered signals output from band-pass filter 34 are demodulated in demodulator 35, and integrated in integrating circuit 36. The integrated signals are waveform-shaped in comparator 37, and output to decoder 15.

As a result, first remote control signal receiver 13 performs filtering at 38 KHz and second remote control signal receiver 14 filters at 100 KHz so that the game key signal transmitted at 38 KHz from first remote controller 11 without a wire is output to decoder 15 through first remote control signal receiver 13, with the game key signal transmitted from second remote controller 12 at 100 KHz being output to decoder 15 through second remote control signal receiver 14.

By establishing different frequency bands of the signals output from remote controllers 11 and 12, remote controlling of the game playing apparatus with two wireless remote controllers is made possible.

Figure 5:
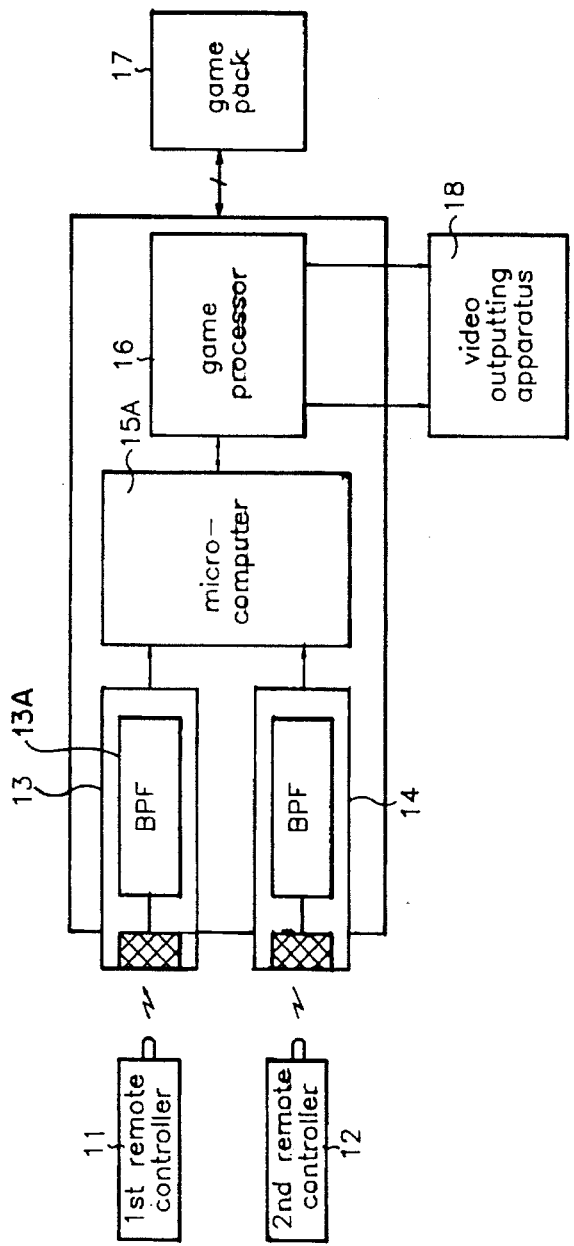
FIG. 5 is a detailed block diagram of FIG. 2.

FIGS. 5 and 6 show an example in which decoder 15 is constructed with a microcomputer 15A.

As shown FIG. 5, first remote control signal receiver 13 is constructed with band-pass filter 13A of 38 KHz, with second remote control signal receiver 14 being constructed with band-pass filter 14A of 100 KHz. They receive the game key signals transmitted from first and second remote controllers 11 and 12, respectively, and waveform-shape the received game key signals into square-wave key data. The waveform-shaped signals are output to microcomputer 15A of decoder 15.

As shown in FIG. 6, the key data waveform-shaped and output from first and second remote control signal receivers 13 and 14 are supplied to input ports A and B of microcomputer 15A.

Figure 7:
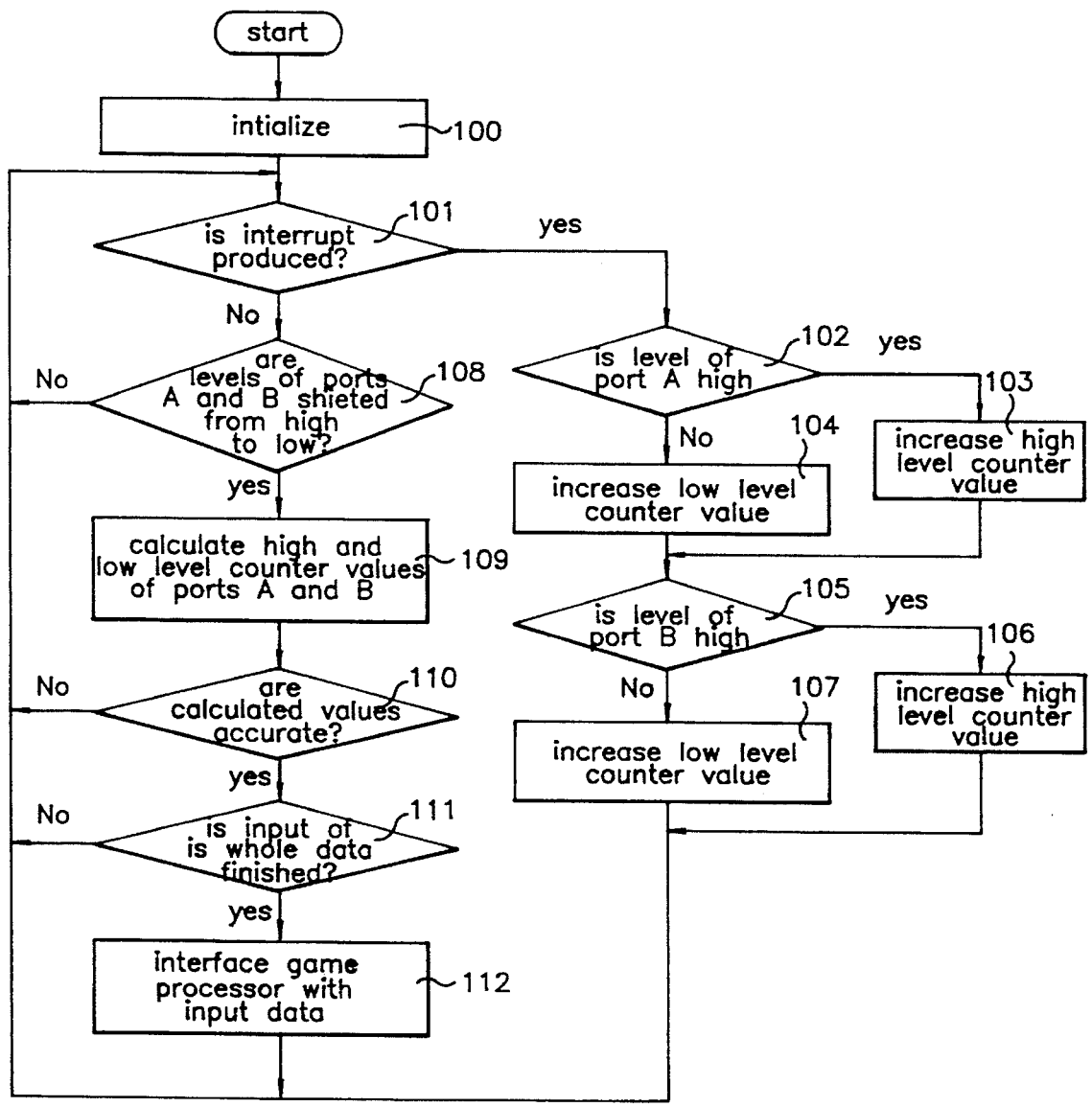
FIG. 7 is a flowchart of a method for detecting the remote controller signal of the microcomputer of FIG. 6.

The key data input to input ports A and B of microcomputer 15A is detected, read out, and output to game processor 18, in the manner described in FIG. 7.

The operation of decoder 15 will be explained with reference to FIG. 7.

First, a setting portion initializes the microcomputer 15A to operate in step 100. Specifically, an interrupt period of 250 μsec is established, and input ports A and B of microcomputer 15A are set as input ports so that the game key signals output from remote control signal receivers 13 and 14 can be received. HIGH/LOW level counters of input ports A and B are initialized at "0."

After initialization, in step 101, it is detected whether the 250 μsec interrupt period is produced or not. If so, it is detected whether the level of input port A is HIGH or not in step 102. If the level of input port A is HIGH, the value of the HIGH level counter is increased in step 103. If the level is not HIGH, the value of the LOW level counter of input port A is increased in step 104. After the level detection of input port A, it is detected whether the level of input port B is HIGH or not in step 105. If so, the value of the HIGH level counter of input port B is increased in step 106. If not, the value of the LOW level counter of input port B is increased in step 107.

When the level detection of input ports A and B is finished, the procedure goes back to step 101 in which it is detected whether the 250 μsec interrupt period is produced or not. If the 250 μsec interrupt period is not produced, the level change of input ports A and B is detected in step 108. Specifically, if the levels of input ports A and B have shifted from HIGH to LOW, the increased values of the HIGH/LOW counters are calculated and it is determined whether the calculated values are accurate or not in steps 109 and 110. If the levels of input ports A and B have not shifted, the procedure moves to step 101. Here, the calculated values are one bit.

If the calculated values are not accurate, the procedure goes to step 101. If the calculated values are accurate, it is detected whether the whole data, that is, header, data and leader, is input or not in step 111. If the whole data is not input, the step of detecting whether the 250 μsec interrupt period is produced or not, is carried out. If the whole data is input, the input data is output to game processor 16.

Figure 8A:
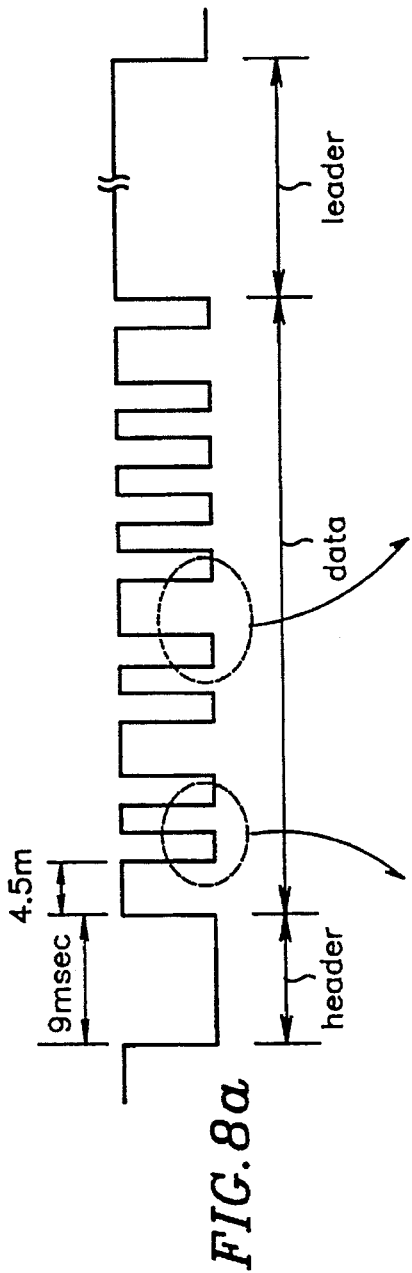
FIG. 8A is a waveform diagram of the output signal of the remote control signal receiver of FIG. 2.
Figure 8B:
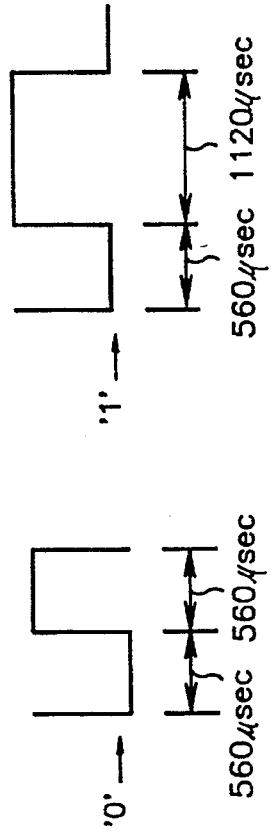
FIG. 8B is a waveform diagram of the output data of the remote control signal receiver of FIG. 2.
Figure 8C:
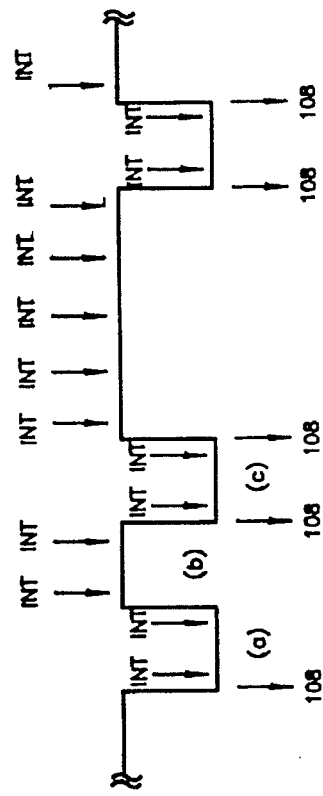
FIG. 8C is a waveform diagram of an interrupt of 250 μsec period and the states of ports shown in FIG. 6.

FIGS. 8A, 8B and 8C show states of detecting and reading out the data output from remote control signal receivers 13 and 14 in decoder 15. FIG. 8A illustrates the waveform of the signals transmitted from remote controllers 11 and 12 and output from remote control signal receivers 13 and 14. FIG. 8B illustrates a state in which "0" or "1" data is shown as a signal. FIG. 8C illustrates the 250 μsec interrupt period and states of input ports A and B.

The game key signals transmitted from remote controllers 11 and 12, received by remote control signal receivers 13 and 14, and converted into electrical signals, are input while being divided into the sections of header, data and leader, as shown in FIG. 8A.

The header section indicates that data is input, as the LOW level signal is maintained for 9 msec and then the HIGH level signal is maintained for 4.5 msec.

After the signal of the header section is input, the signal corresponding to the data section is input. Here, eight-bit data is usually input.

The leader section indicates that the input of the data is finished. In this section, a HIGH or LOW signal is input.

In the input data, "0" and "1" data show different waveforms, as shown in FIG. 8B. If the LOW level signal is maintained for 560 μsec and then the HIGH level signal is maintained for 560 μsec, this state indicates "0" data. If the LOW level signal is maintained for 560 μsec and then the HIGH level signal is maintained for 1120 μsec, this state indicates "1" data.

In step 101 of detecting whether the 250 μsec interrupt period is produced or not, if the 250 μsec interrupt period is generated, the levels of ports A and B are detected continuously during the 250 μsec periods. Even when the 250 μsec interrupt period is not produced, if it is detected that ports A and B have shifted from HIGH to LOW levels, the signal waveform is shown as in FIG. 8C.

When the 250 μsec interrupt is not produced and ports A and B are shifted from HIGH to LOW levels, the counting values of the HIGH/LOW levels of ports A and B at the 250 μsec interrupt are calculated. Then, it is determined which is the data section between the "0" and "1" data shown in FIG. 8B.

Specifically the LOW level counter value is "2" in section (a). The HIGH level counter value is "2" in section (b). The counter value is "2" in the LOW level section (c). This information allows the input data to be determined.

Figure 9:
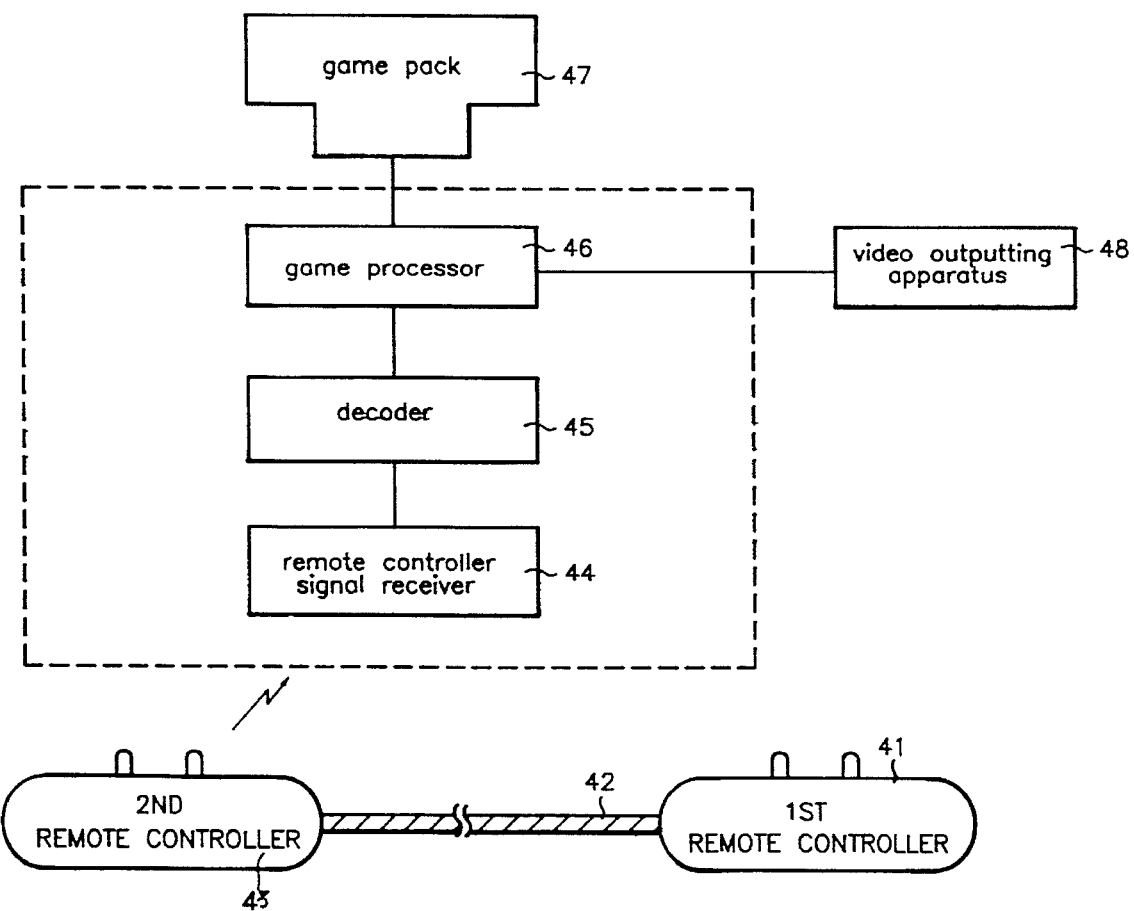
FIG. 9 is a block diagram of another embodiment of the two-player game playing apparatus using wireless remote controllers of the present invention.

Another embodiment of the two-player game playing apparatus using wireless remote controllers of the present invention is made up of a wire first remote controller 41, a wireless second remote controller 43, a remote control signal receiver 44, a decoder 45, a game processor 46, a game pack 47, and a video outputting apparatus 48, as shown in FIG. 9.

First remote controller 41 outputs the game key signal input by the first player through a wire cable 42. Second remote controller 43 is connected to first remote controller 41 with wire cable 42 so that the game key signal input through wire cable 42 from first remote controller 41 and the game key signal input by the second player are transmitted without a wire.

Remote control signal receiver 44 receives the game key signals of the first remote controller 41 and second remote controller 43, with the signals from both controllers 41 and 43 being transmitted by the second remote controller 43 without a wire to the receiver 44.

Decoder 45 reads out the game key signals output from remote control signal receiver 44. Game pack 47 provides a game program.

Game processor 46 reads out and performs the program from game pack 47 according to the respective players' game key signals output from decoder 45.

Video outputting apparatus 48 processes the game video and audio signals output from game processor 46, outputting them in an image and sound.

The operation of this embodiment of the two-player game playing apparatus using a wireless remote controller of the present invention will be described below.

In response to a first player's key input, the first remote controller 41 provides a key signal to the second remote controller 43 through wire cable 42. In response to a second player's key input, as well as when receiving a key signal from the first remote controller 41, the second remote controller 43 generates a game key signal and transmits the game key signal without a wire to receiver 44. The game key signals of first and second remote controllers 41 and 43 transmitted from second remote controller 43 are received in remote control signal receiver 44 and converted into electrical signals. The converted signals are read as game key signals corresponding to the respective players in decoder 45, and output to game processor 46.

Game processor 46 reads out and performs a corresponding program from game pack 47 according to the respective players' game key signals output from decoder 45. The result of performance is output as an image and sound through video outputting apparatus 48, thereby providing a game function performed by two players.

FIGS. 10A and 10B show the connection state and structure of first and second remote controllers 41 and 43 of FIG. 9.

Second remote controller 43 includes a connector 42A for allowing first remote controller 41 to be connected to or detached from second remote controller 43 via wire cable 42, as shown in FIGS. 10A and 10B.

In a case in which wire first remote controller 41 connected to second remote controller 43 through wire cable 42 is not used, the first remote controller is detached therefrom by using connector 42A. In a case in which wire first remote controller 41 is used, it is connected to the second remote controller 43. This depends upon the use of first remote controller 41.

First remote controller 41 is constructed only with a key matrix 41A which is connected to wire cable 42 so that the first player inputs a game key signal, as shown in FIG. 10A.

Second remote controller 43 comprises a key matrix 43C for allowing the second player to input a game key signal, a microcomputer 43A for detecting key matrix 43 and key matrix 41A and outputting a key code of a format corresponding to a pressed key, and a transmitting portion 43B for transmitting the key code output from microcomputer 43A without a wire.

The game key signal transmitted from remote controller 43 has a format made up of a header, mode test code, second remote controller key data, first remote controller key data, and leader, as shown in FIG. 11.

The operation of the first and second remote controllers 41 and 43 will be described below.

When the first player presses key matrix 41A of first remote controller 41, the result is output to microcomputer 43A through wire cable 42. Microcomputer 43A detects which key is pressed on key matrix 41A.

If the second player presses key matrix 43C of second remote controller 43, microcomputer 43A detects which key is pressed on key matrix 43C.

Microcomputer 43A forms the key signals of key matrices 41A and 41C in the key codes of corresponding formats as shown in FIG. 11, and transmits the signals through transmitting portion 43B without a wire.

The game key signal transmitted from second remote controller 43 without a wire is constructed sequentially with a header, mode test code, second remote controller key data, first remote controller key data, and leader, as shown in FIG. 11.

If keys K1, K2, K3 and K4 of key matrix 43C of second remote controller 43 are turned on, corresponding key data KD1, KD2, KD3 and KD4 are set. If keys K5, K6, K7 and K8 of key matrix 41A of first remote controller 41 are turned on, corresponding key data KD5, KD6, KD7, and KD8 are set. In this method, the key data of the respective remote controllers 41 and 43, that is, first and second remote controller key data, are transmitted.

The key code transmitted from second remote controller 43 is received in remote control signal receiver 44, converted into a square signal, and read out in decoder 45. The read out code is supplied to game processor 46 so that the game program is performed. This enables two players to play the game.

As described above, the game playing apparatus of the present invention allows two players both to enjoy a game with wireless remote controllers. Further, the microcomputer is employed only in one of the two remote controllers, thereby reducing the production cost and simplifying the configuration.

What is claimed is:

1. A two-player game playing apparatus for playing a game program stored in a game pack using wireless remote controllers, the two-player game playing apparatus comprising:

a first remote controller for transmitting without a wire a game key signal input by a first player in a specific frequency band;

a second remote controller for transmitting without a wire a game key signal input by a second player in a frequency band which is different from the frequency band of the game key signal transmitted from said first remote controller;

a first remote control signal receiver for receiving the game key signal transmitted from said first remote controller without a wire;

a second remote control signal receiver for receiving the game key signal transmitted from said second remote controller without a wire;

a decoder for reading out the respective players' game key signals output from said first and second remote control signal receivers;

a game processor for reading out and performing the game program from said game pack according to the respective players' game key signals output from said decoder; and a video outputting apparatus for processing game video and audio signals output from said game processor and outputting the signals as an image and sound.

2. The two-player game playing apparatus recited in claim 1, wherein said first remote control signal receiver transmits the game key signal input by said first player at 38 KHz.

3. The two-player game playing apparatus recited in claim 1, wherein said second remote control signal receiver transmits the game key signal input by said second player at 100 KHz.

4. The two-player game playing apparatus recited in claim 2, wherein said first remote control signal receiver receives the game key signal transmitted from said first remote controller and filters the signal at 38 KHz.

5. The two-player game playing apparatus recited in claim 3, wherein said second remote control signal receiver receives the game key signal transmitted from said second remote controller and filters the signal at 100 KHz.

6. The two-player game playing apparatus recited in claim 1, wherein said first remote control signal receiver comprises:

a remote controller sensor for receiving the game key signal transmitted from said first remote controller and for converting the game key signal into an electrical signal;

an amplifier for amplifying the electrical signal output from said remote controller sensor;

a limiter for limiting the level of the amplified signal;

a band-pass filter for filtering the limited signal at a frequency band corresponding to the transmission frequency band of said first remote controller;

a demodulator for demodulating the filtered signal;

an integrating circuit for integrating the demodulated signal; and a comparator for waveform-shaping the integrated signal.

7. The two-player game playing apparatus recited in claim 1, wherein said second remote control signal receiver comprises:

a remote controller sensor for receiving the game key signal transmitted from said second remote controller and for converting the game key signal into an electrical signal;

an amplifier for amplifying the electrical signal output from said remote controller sensor;

a limiter for limiting the level of the amplified signal;

a band-pass filter for filtering the limited signal at a frequency band corresponding to the transmission frequency band of said first remote controller;

a demodulator for demodulating the filtered signal;

an integrating circuit for integrating the demodulated signal; and a comparator for waveform-shaping the integrated signal.

8. A two-player game playing apparatus for playing a game program stored in a game pack using wireless remote controllers, the two-player game playing apparatus comprising:

a first remote controller for receiving a first input by a first player;

a second remote controller, connected to said first remote controller by a wire cable, for receiving a second input by a second player, and for transmitting without a wire a game key signal responsive to at least one of first input and the second input;

a remote control signal receiver for receiving the game key signal transmitted from said second remote controller;

a decoder for decoding the game key signal from said remote control signal receiver;

a game processor for reading out the game program from said game pack, for executing the game program according to the game key signal output from said decoder, and for generating game video and audio signals according to the executed game program; and a video outputting apparatus for outputting the game video and audio signals.

9. The two-player game playing apparatus recited in claim 8, wherein said second remote controller includes a connector for allowing said first remote controller to be optionally connected to said second remote controller via said wire cable.

10. The two-player game playing apparatus recited in claim 8, wherein said first remote controller is constructed with a first key matrix that is connected to said wire cable for allowing said first player to input the first input.

11. The two-player game playing apparatus recited in claim 10, wherein said second remote controlled comprises:

a second key matrix for allowing said second player to input the second input;

a microcomputer for detecting the second input from said second key matrix and the first input from said first key matrix and outputting a key code of a format corresponding to at least one of the first input and the second input; and a transmitting portion for transmitting the key code output from said microcomputer without a wire.

12. The two-player game playing apparatus recited in claim 8, wherein the game key signal transmitted from said second remote controller has a format made up of a header, mode test code, second remote controller key data, first remote controller key data, and leader.

13. A game playing system for playing a game program stored in a game pack using wireless remote controllers, the system comprising:

a game playing apparatus body;

a first wireless remote controller for transmitting in a predetermined frequency band a first game key signal to the game playing apparatus body;

a second remote controller for transmitting in a frequency band different from the frequency band used to transmit the first game key signal a second game key signal to the game playing apparatus body; and said game playing apparatus body comprising:

a first remote control signal receiver for receiving the first game key signal, a second remote control signal receiver for receiving the second game key signal, a decoder for reading out the first game key signal output from said first remote control signal receiver and for reading out the second game key signal output from said second remote control signal receiver, a game processor for reading out the game program from said game pack, for performing the game program according to the first game key signal and the second game key signal output from said decoder, and for generating game video and audio signals according to performed game program, and an outputting apparatus for outputting the video and audio signals.

* * * * *